(No Model.) 5 Sheets—Sheet 1.

W. H. PAGE.
STEAM GENERATOR.

No. 342,875. Patented June 1, 1886.

Attest:
W. H. N. Knight,
S. O. Edmonds

Inventor:
William H. Page
By his Attorneys
Edson Bros (No Model.)  W. H. PAGE.  5 Sheets—Sheet 2.
STEAM GENERATOR.
No. 342,875. Patented June 1, 1886.
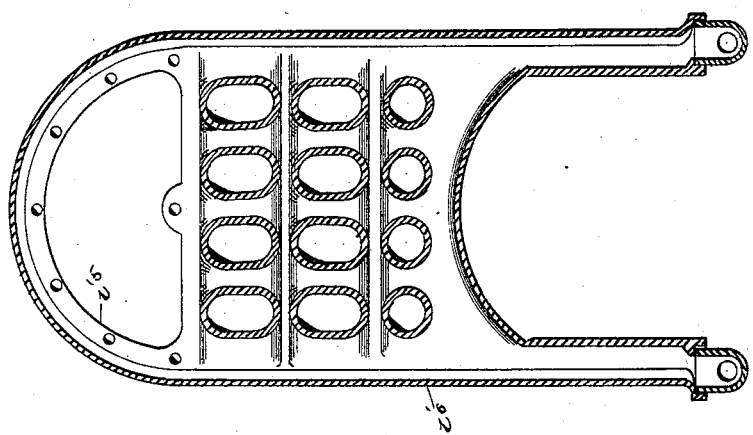
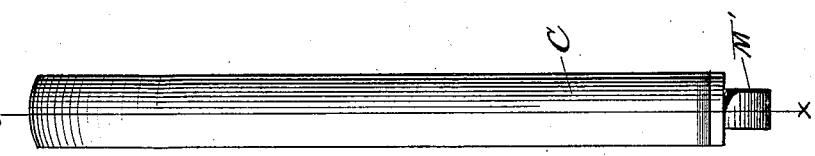
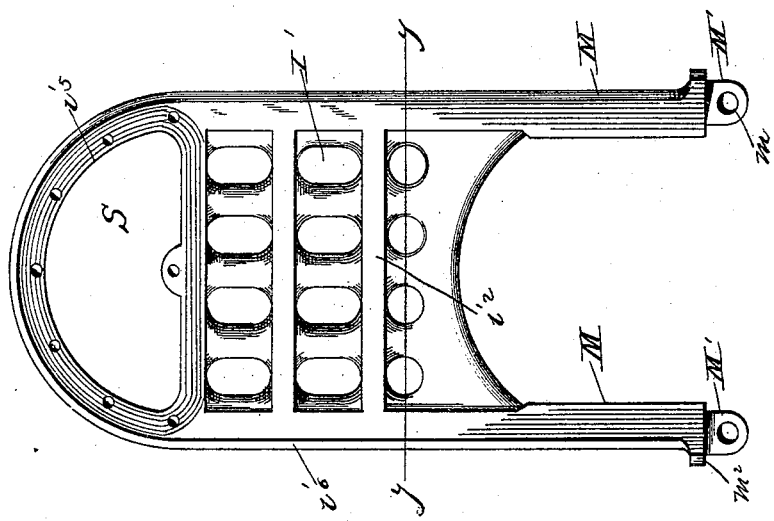
Attest:
W. H. H. Knight
S. V. Edmonds
Inventor:
William H. Page,
By his Attorneys
Edson Bros.

(No Model.) 5 Sheets—Sheet 3.
W. H. PAGE.
STEAM GENERATOR.
No. 342,875. Patented June 1, 1886.
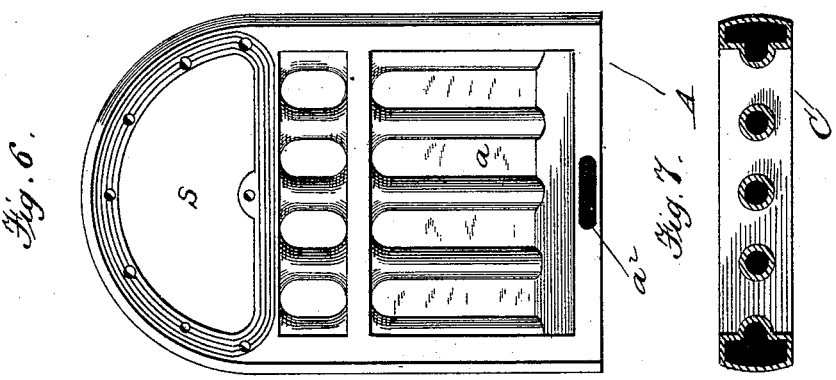
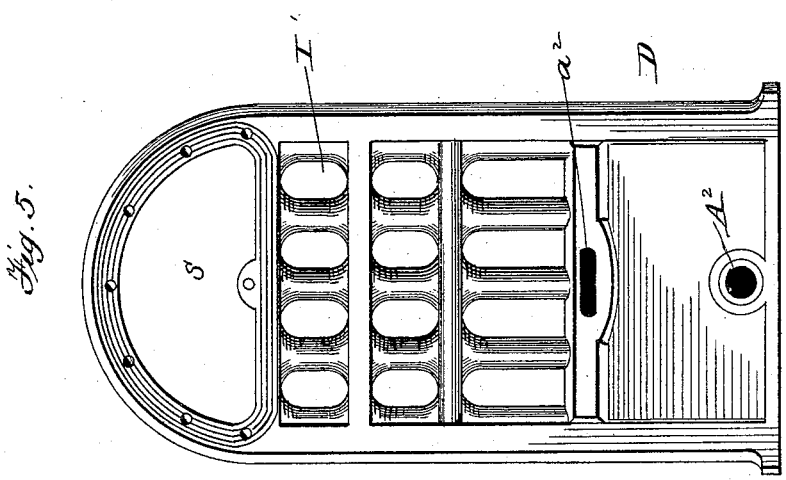
Attest:
W. H. Knight,
S. T. Edmonds
Inventor:
William H. Page
By his Attorneys,
Edson Bro's (No Model.) 5 Sheets—Sheet 4.

W. H. PAGE.
STEAM GENERATOR.

No. 342,875. Patented June 1, 1886.

Attest:
W. H. Knight
S. V. Edmonds

Inventor:
William H. Page,
By his Attorneys,
Edson Bro's.

N. PETERS, Photo-Lithographer, Washington, D. C.

(No Model.)  5 Sheets—Sheet 5.

W. H. PAGE.
STEAM GENERATOR.

No. 342,875.  Patented June 1, 1886.

Attest:
W. N. Knight
S. V. Edmonds

Inventor:
William H. Page
By his Attorneys
Edson Bros.

UNITED STATES PATENT OFFICE.

WILLIAM H. PAGE, OF PRESTON, CONNECTICUT.

STEAM-GENERATOR.

SPECIFICATION forming part of Letters Patent No. 342,875, dated June 1, 1886.

Application filed October 17, 1885. Serial No. 180,187. (No model.)

*To all whom it may concern:*

Be it known that I, WILLIAM H. PAGE, a citizen of the United States, residing at Preston, in the county of New London and State of Connecticut, have invented certain new and useful Improvements in Steam-Generators, of which the following is a specification, reference being had therein to the accompanying drawings.

This invention relates to steam-generators of the class adapted for heating purposes or service in connection with heat-radiators; and the novelty consists in the construction, arrangement, and adaptation of parts, as will be more fully hereinafter set forth, and specifically pointed out in the claims.

The generator is specially adapted to large halls or buildings. It is made in sections, and each generator comprises two end sections and any desired number of intermediate sections. Each section is formed with an enlarged chamber above, and the several connected chambers form a steam-drum common to all the sections. The sections are secured together in series by internal bolts and by right and left threaded connections.

The invention is illustrated in the accompanying drawings, which form a part of this specification, and in which—

Figure 1:
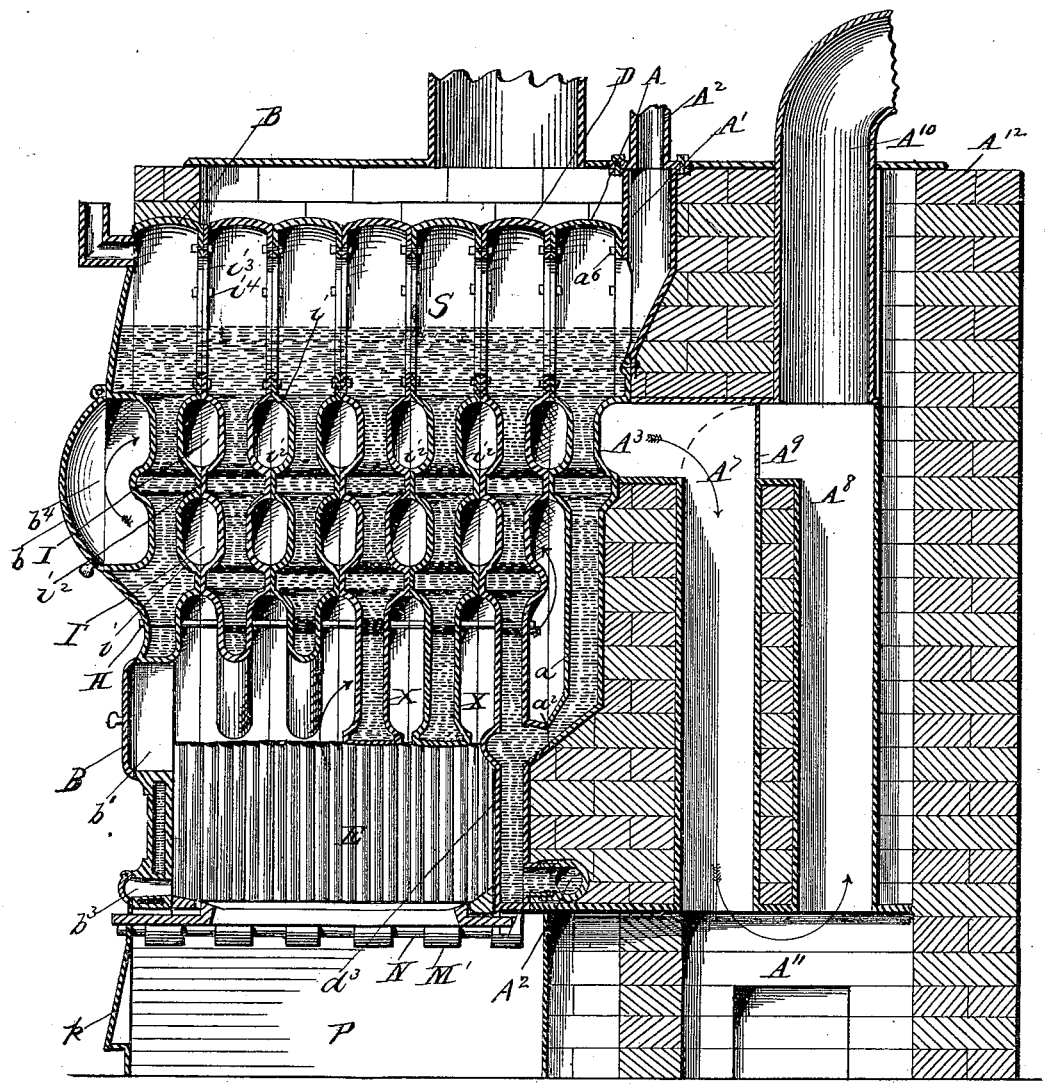
Figure 8:
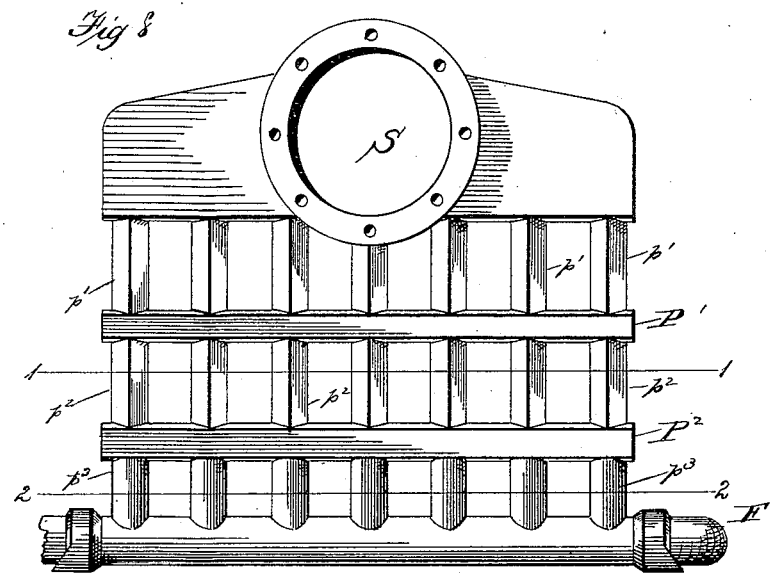
Figure 9:
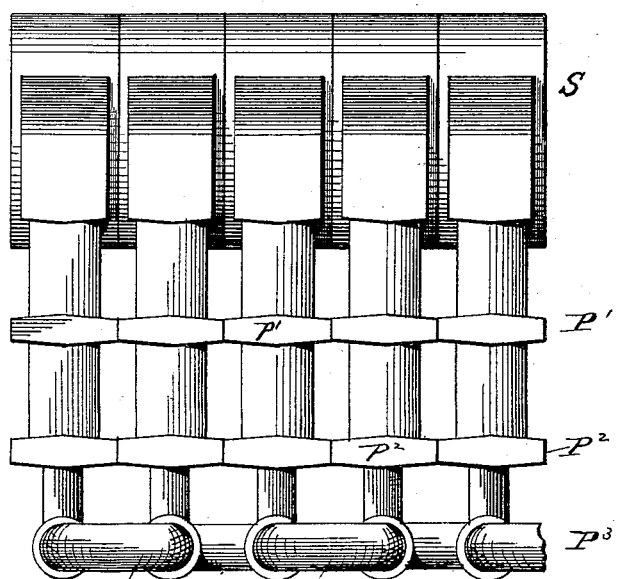
Figure 10:
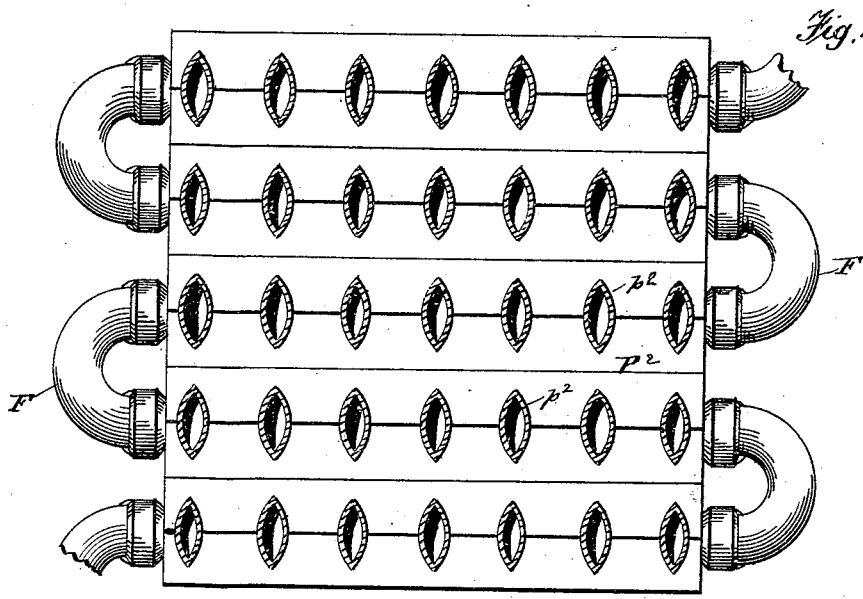
Figure 11:
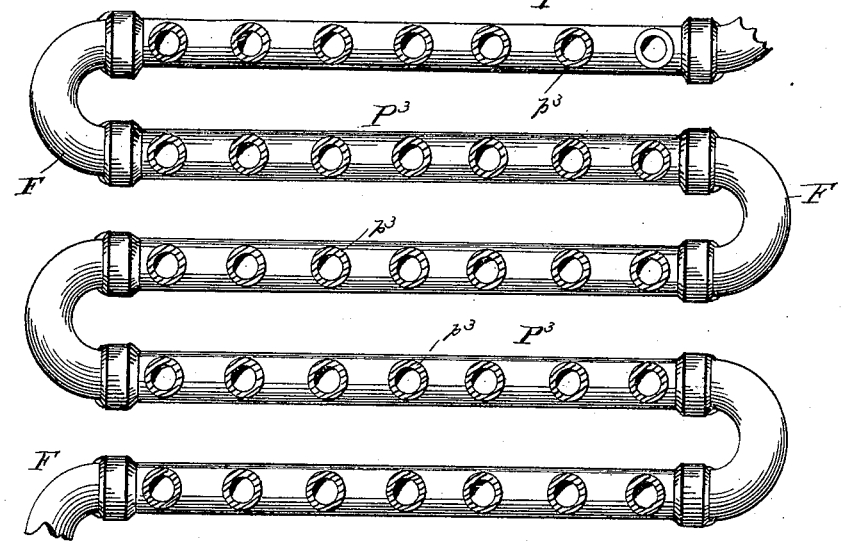

Figure 1 is a longitudinal vertical section of one form of boiler. Fig. 2 is an elevation of one of the intermediate sections disengaged. Fig. 3 is an edge elevation of the same. Fig. 4 is a vertical section taken on the line $x\ x$ of Fig. 3. Fig. 5 is an elevation of the back section, a portion of which forms the back of the fire-box. Fig. 6 is an inner face elevation of the front section. Fig. 7 is a horizontal section on the line $y\ y$ of Fig. 2. Fig. 8 is a face view of one of the sections of another form of boiler. Fig. 9 is a side elevation of such modified form. Fig. 10 is a horizontal section taken on the line $n\ n$ of Fig. 8. Fig. 11 is a section taken on the line $o\ o$ of Fig. 8.

Referring to the drawings, A designates the back section, B the front section, and C the intermediate sections, of which latter there may be any desired number. The section adjacent to the back section, A, differs from the other intermediate sections, and will be herein distinguished by the letter D. One or both faces of each section are provided with transverse recesses $i$, which, when the sections are secured, register and form transverse fire-flues I, which connect at short intervals with longitudinal fire spaces or flues I', arranged at right angles therewith. The faces of the sections are provided with projecting horizontal ledges $i^2$, which abut together in the complete generator to form crown-sheets, which separate the several flues into different horizontal series, the several series thus formed being connected together at alternate ends, as will be described. Each section has abutting surface $i^3$, and bolts $i^4$ operate through such surfaces or collars to secure the sections together, adjacent faces having communication with each other through apertures $i^5$, to form a water and steam drum, S, common to all the sections. The inner face of the back section, A, has a concave, $a$, which connects the lower horizontal series of fire-flues with the middle series, and is provided with a water-way, $a^2$, which connects the interior of section A with that of section D. The several sections are bolted together from the front backward, and after the last section, B, has been bolted to the section D a plate, A', carrying a steam-exit, A², is securely tapped to the back of the section A by bolts A⁶. The products of combustion find their exit at A³, and thence to the flue A¹⁰, through a downflue, A⁷, and an upflue, A⁸, built in the masonry A¹², and connected above by a damper, A⁹, and below by a chamber, A¹¹. All the sections except the back section have water-legs M, which are open at the bottom, and into the open ends $m$ of these legs are sprung expanded or rusted-in boxes M'. This construction is for convenience in casting, and each box M' has upon adjacent sides threaded apertures $m'$, into which are tapped by right and left hand threads connecting-pipes N, to connect the several water-legs at the bottom upon either side. The face $d^3$ of the section D forms the back of the fire-box E, and the several water-legs of the sections C form the sides thereof. Each of the sections has a shoulder, $m^2$, or is otherwise provided with means for being supported on an ash-box, P, having a door, $p$. The section B has a hinged door, $b$, which incloses a chamber, $b^4$, connecting the middle series of horizontal flues with the upper series, a water-leg, $b'$, which forms in part the front of the fire-box, and a covered part, $b^3$, through which the burning fuel may be manipulated. Two or more of the rearmost sections, C, have water-legs $x\ x$, which at their lower portions comprise the roof of the fire-box, which serves to throw the flames well to the front of the fire-box before they reach the horizontal flues.

In setting up the boiler, the section B, including its water-box M′, is first put into position. A proper section, C, is then placed into position, and the two boxes M′ of these sections are connected by one of the coupling-pipes N, its right and left hand threads serving to secure it to both sections simultaneously, and to hold the lower portions of these sections together. The bolts $i^4$ are then secured by manipulating through the aperture $i^5$ in the section C. This operation is continued until the back section is secured, when the plate A′ is secured in position, as shown. Each section abuts against the adjacent section along the exterior edge, $i^6$, and horizontally at points $i^2\ i^2\ i^2$, to form the crown-sheets for the horizontal fire-flues L′. These horizontal fire-flues L′ are connected, as shown, at alternate ends by the concave $a$ and the chamber $b^4$.

To increase combustion, I supply fresh air to the chamber formed in part by the concave $a$ by pipes H, as seen in Fig. 1.

The figure shown in Figs. 8, 9, 10, and 11 is simply a modification embracing all the essential elements of the invention in a merely modified form. In either construction $A^2$ designates a water-connection.

Each section is formed with four horizontal chambers, and secured together by bolts $i^4$. One of these chambers comprises the steam-drum S, and parallel with this drum are chambers P′ $P^2$ $P^3$, the chamber P being connected to the steam-drum S in each series by elliptical vertical pipes $p'$. The chambers P′ are connected to the chambers $P^2$ by a similar series of pipes, $p^2$. The chambers S, P′, and $P^2$ are of approximately equal width, and their external walls are arranged closely adjacent when the sections are placed together, the abutting parts corresponding to the parts marked $i^2$ in Figs. 2, 4, 5, and forming horizontal flues corresponding to those I in the said figures. The lowest horizontal chambers, $P^3$, are cylindrical, and are connected to the chambers $P^2$ by a series of cylindrical pipes, $p^3$, and these parts $P^3$ $p^3$ are of much smaller diameter than those marked P′ $P^2$, to allow the products of combustion to pass freely between them. Adjacent sections are connected by U-pipes F, instead of the coupling-pipes N, and these are arranged alternately upon opposite ends, as seen in Figs. 9 and 10. The flue formed between the chambers $P^2$ and $P^3$ may be connected to the flue above in any manner which is equivalent to the chamber formed by the concave $a$, and lettered $b^5$ in Fig. 1, and the flues between the chambers P′ and $P^2$ and between P′ and S may be connected by any of the equivalents of the chamber $b^4$ in said figure.

The operation of the device will be obvious.

What I claim as new is—

1. In a steam-boiler, substantially as described, the combination, with the section D, having water-connections and flue-passages, of the section A, having concave $a$ and water-way $a^2$, connecting it with the section D at the base of said concave, as and for the purpose set forth.

2. The combination, with the sections A B C, as described, having abutting interior flanges, $i^3$, of securing-bolts $i^4$, passing through adjacent flanges, whereby the sections are secured together in series, and plate A′, carrying steam-exit $A^2$, secured to the back of the last section, A, as set forth.

3. In a steam-boiler, as described, the several sections A B C, having water-legs with threaded apertures, combined with connecting-pipes having right and left hand threads, arranged to connect the interiors of adjacent sections and to secure and hold such sections together, as set forth.

4. In a steam-boiler, the combination, with the section D, having water-leg $d^3$, which forms the back of the fire-box, the sections C, having concave $a$ and water-way $a^2$, of the section B, having hinged door $b$, inclosing the draft connecting-chamber $b^4$, a water-leg, $b'$, which forms in part the front of the fire-box, and a covered port, $b^3$, as and for the purposes specified.

5. In a steam-generator, as described, the combination, with the several sections B C D, having water-legs M, with joints $m$, of the boxes M′ and connecting-pipes N, as and for the purpose set forth.

6. In a steam-boiler, as described, the combination, with the several sections having water-legs which form the walls of the fire-box, of water-legs $x\ x$, formed in the rearmost intermediate sections and depending into the rear of the fire-box, to throw the flames well to the front before they enter the horizontal flues, as set forth.

7. In a steam-boiler, as described, the combination, with the sections A B C and with the draft-space formed at the rear of the boiler by the concave $a$, of the fresh-air tube H, leading to such draft-space and passing through the lower horizontal flue, whereby fresh heated air is supplied to the products of combustion, as set forth.

In testimony whereof I affix my signature in presence of two witnesses.

WILLIAM H. PAGE.

Witnesses:
LUCIUS BROWN,
GEO. C. SETCHELL.